US006563247B2

United States Patent
Nguyen

(10) Patent No.: US 6,563,247 B2
(45) Date of Patent: May 13, 2003

(54) AC GENERATOR HAVING STATOR ASSEMBLY WITH IMPROVED PHASE COIL INSERTION ORDER TO REDUCE NOISE

(75) Inventor: Thieu X Nguyen, Pendleton, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/861,179

(22) Filed: May 18, 2001

(65) Prior Publication Data

US 2002/0171310 A1 Nov. 21, 2002

(51) Int. Cl.[7] .................................................. H02K 3/00
(52) U.S. Cl. ........................ 310/180; 310/179; 310/184; 310/185
(58) Field of Search ................................ 310/179, 180, 310/184, 185, 198, 199, 208, 254, 258, 259, 263, 264

(56) References Cited

U.S. PATENT DOCUMENTS

| | | | | |
|---|---|---|---|---|
| 3,321,653 A | * | 5/1967 | Sonoyama | .................. 310/180 |
| 3,396,324 A | * | 8/1968 | Karlsson et al. | ............... 321/28 |
| 4,356,418 A | * | 10/1982 | Stroud | ......................... 310/184 |
| 4,409,507 A | * | 10/1983 | Godwin | ....................... 310/205 |
| 5,122,705 A | * | 6/1992 | Kusase et al. | ............. 310/68 D |
| 5,691,590 A | | 11/1997 | Kawai et al. | ................ 310/180 |

* cited by examiner

Primary Examiner—Thanh Lam
(74) Attorney, Agent, or Firm—Margaret A. Dobrowitsky

(57) ABSTRACT

An electrical generator has a rotor and a stator core wound with two three-phase delta-connected stator windings. In a 12 rotor pole, 72 tooth/slot stator core, the first, second and third phase coils corresponding to the first stator winding are wound such that respective starting leads of the coils are progressively offset by two slots. The fourth, fifth and sixth phase coils of the second stator winding are also wound, with respect to each other, such that their starting leads are progressively offset by two slots. The starting lead of the first to be inserted phase coil of the second stator winding is offset 65 degrees mechanical from the starting lead of the last to be inserted phase coil of the first stator winding. Airflow noise is reduced, particularly in the 18th order harmonic.

15 Claims, 4 Drawing Sheets

AC GENERATOR HAVING STATOR ASSEMBLY WITH IMPROVED PHASE COIL INSERTION ORDER TO REDUCE NOISE

TECHNICAL FIELD

The present invention relates generally to a stator assembly for an electric motor, alternator or generator, and, more particularly, to an improved phase coil insertion order for the stator assembly to reduce wind noise.

BACKGROUND OF THE INVENTION

Generators are found in virtually every motor vehicle manufactured today. These generators, also referred to as alternators, produce the electricity necessary to power a vehicle's electrical accessories and charge a vehicle's battery. Generators must produce electricity in sufficient quantities to power a vehicle's electrical system. Furthermore, generators must produce electricity having the characteristics necessary to be compatible with a vehicle's electrical components. In addition, it is desirable for generators to produce as little noise as possible while operating.

A generator includes a stator and a rotor. In most generators, the stator consists of a metallic, magnetically-permeable core and one or more current-carrying stator windings in which voltages are induced by a changing magnetic flux. Typically, the core is an annular shaped structure. The internal circumference of the stator is formed with multiple tooth shaped protrusions separated by intervening slots. The stator winding is commonly formed by interconnecting three phase coils in a delta or wye connected arrangement. The phase coils are generally inserted into the slots and wound around the stator in one of a variety of known configurations called winding patterns.

In normal operation, the winding of the rotor is supplied with a current, which induces a magnetic flux in each of the rotor poles. As the rotor rotates, the flux generated at the poles cuts through the stator winding, generating an alternating current (AC) in it. The alternating current generated in the stator winding typically passes through rectifying circuitry before it is introduced into the electrical system of the vehicle.

The winding pattern of the stator winding and the configuration of stator teeth and slots are significant factors in the generator's operating characteristics. Generator stators typically have one set of three-phase current carrying windings, but can have two or more stator windings. Each winding may consist of multiple coils each corresponding to a respective electrical phase p, of which there are typically three. As described above, wires that make up the stator windings are wound into the slots between adjacent stator teeth. Typically, the wire is wound around the stator teeth several times such that bundles of wire of the same phase are disposed in each slot.

One characteristic that the selected winding pattern affects is noise; both magnetic noise produced by the generator during operation and wind noise produced as a result of air flowing through and around the stator windings. The latter is due to a conventional, internal fan portion of the AC generator forcing air through the phase coil loops and ends. A so-called standard straight wave winding pattern is known; however, it exhibits poor mechanical tonal sound quality, particularly in the $6^{th}$, 12th and 18th orders harmonics.

U.S. Pat. No. 5,122,705 to Kusase et al. entitled "ALTERNATING CURRENT GENERATOR HAVING A PLURALITY OF INDEPENDENT THREE-PHASE WINDINGS" discloses a winding pattern that purports to reduce wind noise. A 12-pole rotor is provided. A stator core is also provided having 72 teeth with 72 intervening slots. The stator core has a first three-phase stator winding (phase coils X, Y and Z) and a second stator winding (phase coils u, v, w) inserted into the slots in the following insertion order: X-u-Z-w-Y-v. It is believed, however, that such winding pattern nonetheless can be improved upon respecting wind noise.

In addition, a so-called reverse progressive (RP) winding pattern is also known that can reduce wind noise relative to a standard straight wave pattern. However, such a winding pattern requires a substantially more complex winding process. Specifically, a very complicated machine is required to wind a stator core in an RP winding pattern, and the cycle time is typically twice as long as other approaches.

There is therefore a need for a generator that minimizes or eliminates one or more of the problems set forth above.

SUMMARY OF THE INVENTION

One advantage of the present invention is that it substantially reduces airflow noise produced by the generator during operation. In one embodiment, the noise level is reduced by as much as 10 db (i.e., 18th order harmonic). This reduction in noise is obtained without any compromise in the cost, quality or performance of the generator.

The invention relates to the stator winding pattern used to configure a stator assembly. In particular, the invention involves a novel phase coil insertion order. A generator according to the invention includes a rotor having n magnetic pole pairs, a stator assembly having a core, first and second stator windings, and rectifiers. The stator core has a plurality 12*n of radially inwardly projecting, axially extending teeth with intervening slots. The first stator winding has first, second and third phase coils associated therewith. The second stator winding has fourth, fifth and sixth phase coils associated therewith. The rectifiers are coupled to the first and second stator windings for rectifying operating voltages generated in the windings. According to the invention, the first, second and third phase coils are sequentially wound on the core by being inserted in the slots in that order, such that respective starting leads of the first, second and third phase coils are progressively offset by n/3 stator teeth. In addition, the fourth, fifth and sixth phase coils are also sequentially wound on the core by being inserted in the slots in that order, after the first, second and third phase coils have been inserted, such that respective starting leads of the fourth, fifth and sixth phase coils are progressively offset by n/3 stator teeth.

In a preferred embodiment, n=6 (i.e., 12 magnetic rotor poles), the stator core includes 72 teeth with 72 slots, and the number of stator teeth that are offset (as defined above) is two. In a preferred embodiment, the first, second and third phase coils are three-phase, delta connected, as are the fourth, fifth and sixth phase coils. In a more preferred embodiment, the starting lead of the first inserted phase of the second set of stator windings is offset 85 degrees mechanical on the stator core relative to the starting lead of the first inserted phase of the first set of stator windings.

Other features and advantages will be apparent to those of ordinary skill in the art from the detailed description and accompanying drawings describing and illustrating the invention by way of example only and not by way of limitation.

BRIEF DESCRIPTION OF THE DRAWINGS

The operative features of the present invention are explained in more detail with reference to the drawings in which.

DESCRIPTION OF THE PREFERRED EMBODIMENT

Figure 1:
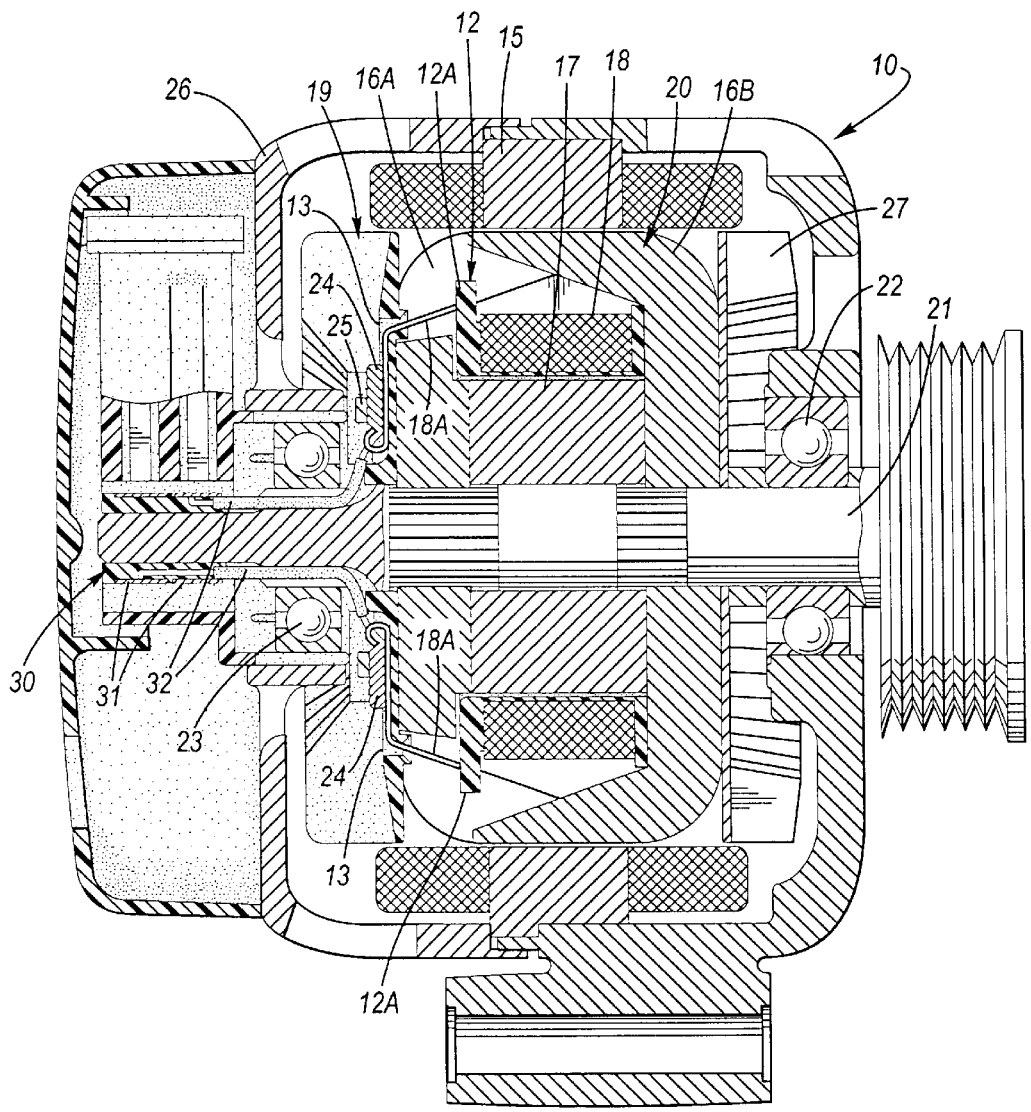
FIG. 1 shows a cross-sectional view of a generator having a phase coil insertion order according to the present invention.

A generator 10 suitable for use in the present invention is illustrated in FIG. 1. Generator 10 has a rotor assembly generally designated by the reference numeral 20 and stator assembly generally designated by the reference numeral 15. The rotor assembly 20 includes a shaft 21 supporting all rotating magnetic circuit structures thereof including conventional pole-members 16A and 16B, rotor core 17 and field coil 18 wound upon bobbin 12. Additionally, all other non-magnetic circuit rotating structures are carried thereby, including air circulation fans 19 and 27 located at axially opposite sides of the pole-members, and a slip ring assembly 30 located at one extreme end of the shaft. Fan 27 may be formed from sheet metal stock and spot welded to pole-member 16B while fan 19 may be formed from an appropriate thermoplastic material and heat staked to tower extensions (not shown) from the field coil bobbin 12. Fans 19 and 27 are configured to establish an air flow through generator 10, particularly through and around the loops and starting/finishing leads of the stator windings, for cooling purposes. However, such air flow may have a tendency to produce wind noise if left uncontrolled. The shaft 21 is rotatably supported within a housing 26 by a pair of bearings 23 and 22. Bearing 23 is located between the slip ring assembly 30 and the fan 19.

Coil leads 18A of field coil 18 are wrapped about respective posts 12A of bobbin 12 and pass through holes 13 in fan 19. Slip ring assembly 30 is made of a pair of copper rings 31, each having a slip ring lead 32 joined such as by welding thereto. The copper rings and wires are molded into a thermoset material to complete the slip ring assembly. Slip ring assembly 30 is pressed onto the end of rotor shaft 21 and the slip ring leads 32 are routed into channels along the shaft 21 where they are joined, such as by twisting and welding, to the coil leads 18A of field coil 18 via a joint 24. The joint 24 is then bent to the surface of the fan 19 and received in a pyramid-shaped tab structure 25. The joint 24 is then secured to fan 19 by ultrasonic welding of the plastic material of the tab 25. Bearing 23 is assembled to pass over the slip ring assembly 30 to retain the lead wires 32 securely within the shaft channels.

Stator assembly 15 has a generally annular shaped core portion with a plurality of radially inwardly projecting, axially extending teeth defining a plurality of intervening slots, as generally known. Each slot has a radially outermost, closed end as well as a radially innermost, open end. The number of slots in the stator core is selected to be, and is dependent on, the number of rotor magnetic poles and the number of electrical phases. In a preferred embodiment, the number of teeth/slots in the stator core is equal to 4×n×p, where n is the number of rotor magnetic pole pairs and p is the number of electrical phases. In one embodiment, the number of rotor pole pairs is six and the number of phases is three, yielding a total of 72 stator teeth/slots. A generator having a stator assembly wound according to the invention may be used in an automotive vehicle.

Rotor assembly 20 may comprise a conventional six pole pair (i.e., 12 magnetic poles) rotor wherein the poles comprise claw shaped teeth.

Figure 2:
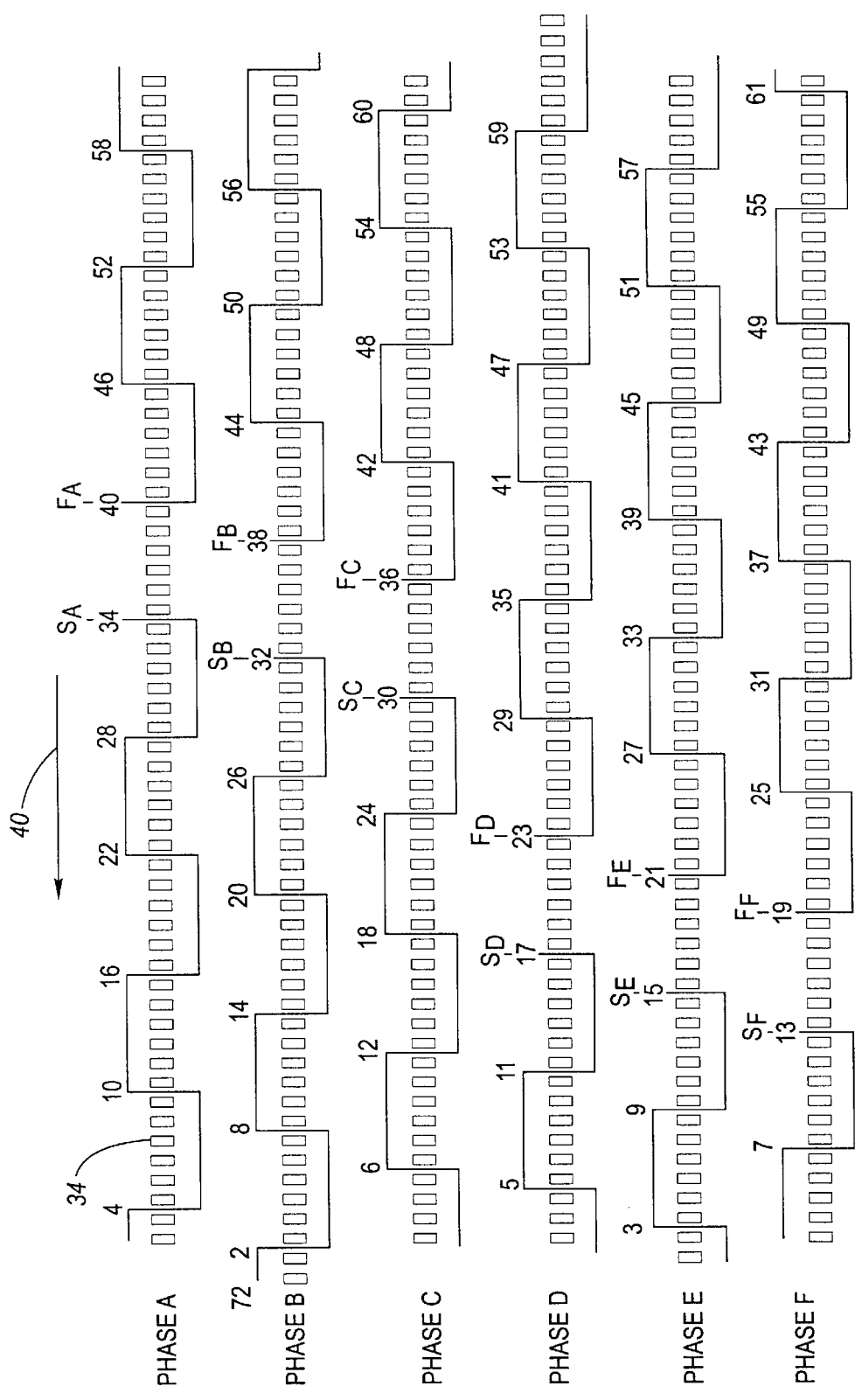
FIG. 2 is a simplified schematic view showing, in greater detail, the stator winding pattern and phase coil insertion order of the present invention.

FIG. 2 is a simplified layout view of a plurality of stator teeth 34. Only one stator tooth 34 is labeled so as to avoid cluttering the illustration of the inventive winding pattern. In the illustrated embodiment, the rotor has n=6 pole pairs, and the stator windings (i.e., there are two in the preferred embodiment) are three-phase; accordingly, the stator core includes 72 teeth with 72 intervening slots. In FIG. 2, the slots are numbered. It should understood, however, that such number is arbitrary, and, further, that adjacent stator teeth have a like number associated therewith.

The invention concerns the stator winding pattern as well as the phase coil insertion order. In a preferred embodiment, a first stator winding 36 (best shown in FIG. 3) comprises phase coil A, phase coil B and phase coil C configured as a three-phase delta-connected stator winding 36. Also in the preferred embodiment, a second stator winding 38 (best shown in FIG. 3) comprises phase coil D, phase coil E and phase coil F configured as a three-phase delta-connected stator winding 38. In FIG. 2, starting leads of the respective phase coils are designated "$S_{phase\_coil\_designation}$" where the subscript "phase_coil_designation" is one of A, B, C, D, E and F. Also in FIG. 2, the finishing lead of the respective phase coils are designated "$F_{phase\_coil\_designation}$" where the subscript "phase_coil_designation" is one of A, B, C, D, E, and F.

With continued reference to FIG. 2, in accordance with the invention, airflow noise may be reduced by winding phase coil A, phase coil B and phase coil C in that order on the stator core by inserting coils A, B and C in the slots such that the respective starting leads $S_A$, $S_B$, and $S_C$ are progressively advanced by n/3, or two slots. That is, phase coil A is wound first on the stator core. In the illustrated embodiment, the starting lead $S_A$ is placed in, for example, slot number 34. Phase coil A is then, for example, straight wave wound around the stator core, skipping six (i.e., n) slots between alternations. As shown, the finish lead $F_A$ ends up in slot number 40. This would be one complete "turn". It is preferable, however, that phase coil A be wound around stator core several more times, as is generally know. Thus, the finish lead $F_A$ would be continued from slot number 40 back into slot number 34, and so on around the stator core. In alternate embodiments, the number of complete "turns" may be nine (i.e., 9T) or eleven (i.e., 11T) using 15¾ AWG, double enamel insulated copper wire. This arrangement results in, respectively, nine or eleven conductors being disposed in the slots into which phase coil A is wound. Of course, the exact number used will depend upon the stator core geometry, the gauge of the wire used, the output requirements of the generator and the like, all factors well known to those of ordinary skill in the art.

Figure 3:
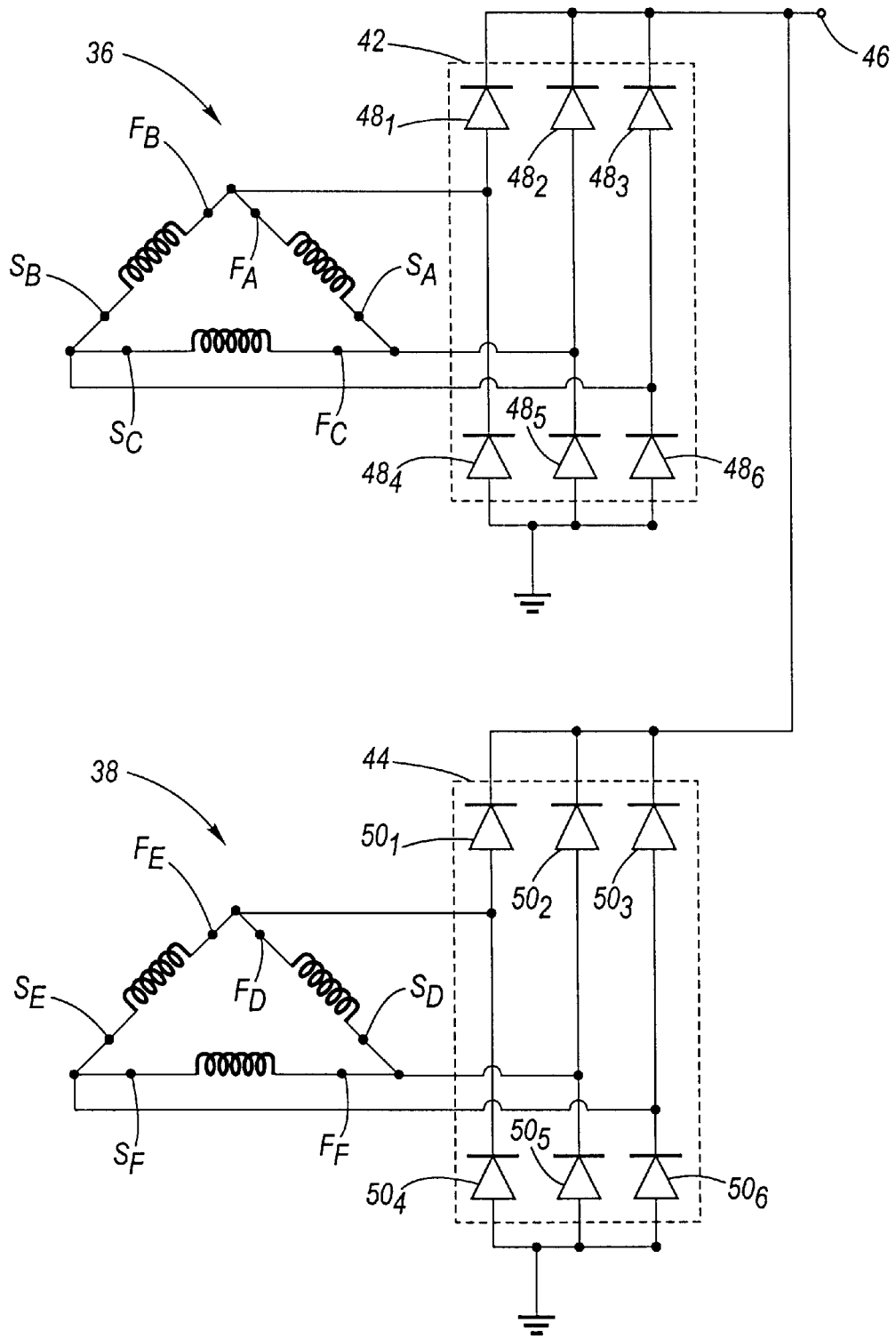
FIG. 3 is a simplified schematic diagram showing how the phase coils of each stator winding are connected, and how the stator winding output is rectified.

Next, phase coil B is wound on the stator core. The starting lead $S_B$ is inserted into a slot that is offset two teeth (or two slots) relative to the slot into which the starting lead $S_A$ is inserted. Phase coil B is wound in the same way described above for phase coil A. Likewise, once phase coils A and B are done, phase coil C is next wound on the stator core. The starting lead $S_C$ is inserted into a slot which is advanced two teeth (or two slots) relative to the slot into which the starting lead for the preceding wound phase coil, namely, $S_B$, is inserted. Note, that all three phase coils A, B and C are inserted in a direction that is the same as the movement of rotor assembly 20 (rotor movement direction designated "40" in FIG. 2). The start and finish lead of phase coils A, B and C are connected as shown in FIG. 3 to form first stator winding 36.

After stator winding 36 has been wound (i.e., phase coils A, B and C), phase coils D, E and F are next sequentially wound on the stator core by being inserted into the slots in that order with the respective starting leads $S_D$, $S_E$ and $S_F$ being progressively offset by two slots. Thus, for the second stator winding 38 containing phase coils D, E and F, phase coil D is wound first on the stator core and whose starting lead starts in slot number 17. Phase coil E is next wound, and starts in slot number 15. Phase coil F is next, and starts in slot number 13. Phase coils D, E and F are wound in the same way as coils A, B and C.

It is important to note that the starting leads of the last-wound phase coil (i.e., phase coil C) of first stator winding 36 and the first-wound phase coil (i.e., phase coil D) of the second stator winding 38 are not offset by two slots, as are the individual starting leads of the phase coils within one or stator winding group. Rather, the starting lead of phase coil D (i.e., in slot number 17) is offset, as illustrated in FIG. 2, by 13 teeth/slots from the starting lead of phase coil C (i.e., slot number 30). This is equivalent to approximately 65 degrees mechanical. In addition, the starting lead of phase coil D may be further offset in multiples of 60 degrees mechanical (i.e., equivalent to 12 slots), in the illustrated embodiment. For example, starting lead $S_D$ may also begin in slot numbers 5, 65, etc. The total offset may be restated as follows:

offset=65 degrees mech.+(60)($i$) deg. mech., where $i$ is an integer 0,1,2 . . .

It should be understood that the physical location of the leads should not interfere with each other, and this consideration may, practically speaking, limit what slots the starting leads for the second group go in.

It is also important to note that once the stator core has been completely wound, the phase coils A, B and C making up the first stator winding 36 occupy even numbered slots while the phase coils D, E and F making up the second stator winding 38 occupy the odd numbered slots. This one slot displacement between the first and second stator windings, in the illustrated 12 rotor pole, three-phase, 72 slot stator assembly, is equivalent to approximately π/6 radians, or 30 deg. electrical.

FIG. 3 shows first stator winding 36 coupled to a first bridge rectifier 42 and second stator winding 38 coupled to a second bridge rectifier 44. Each rectifier 42, 44 is configured to provide full-wave rectification of alternating current (AC) input voltages. The respective bridge outputs are coupled to a common generator output designated 46. Rectifier 42 includes six power diodes $48_1$, $48_2$, . . . , $48_6$ and rectifier 44 includes six power diodes $50_1$, $50_2$, . . . , $50_6$, arranged in a well known configuration.

FIG. 3 also shows the starting/finishing lead connections that are made to form the dual three-phase stator windings 36, 38. To form first stator winding 36, leads $F_A$ and $F_B$ are connected, $S_A$ and $F_C$ are connected, and $S_B$ and $S_C$ are connected. To form second stator winding 38, leads $F_E$ and $F_D$ are connected, $S_D$ and $F_F$ are connected, and $S_E$ and $S_F$ are connected.

Figure 4:
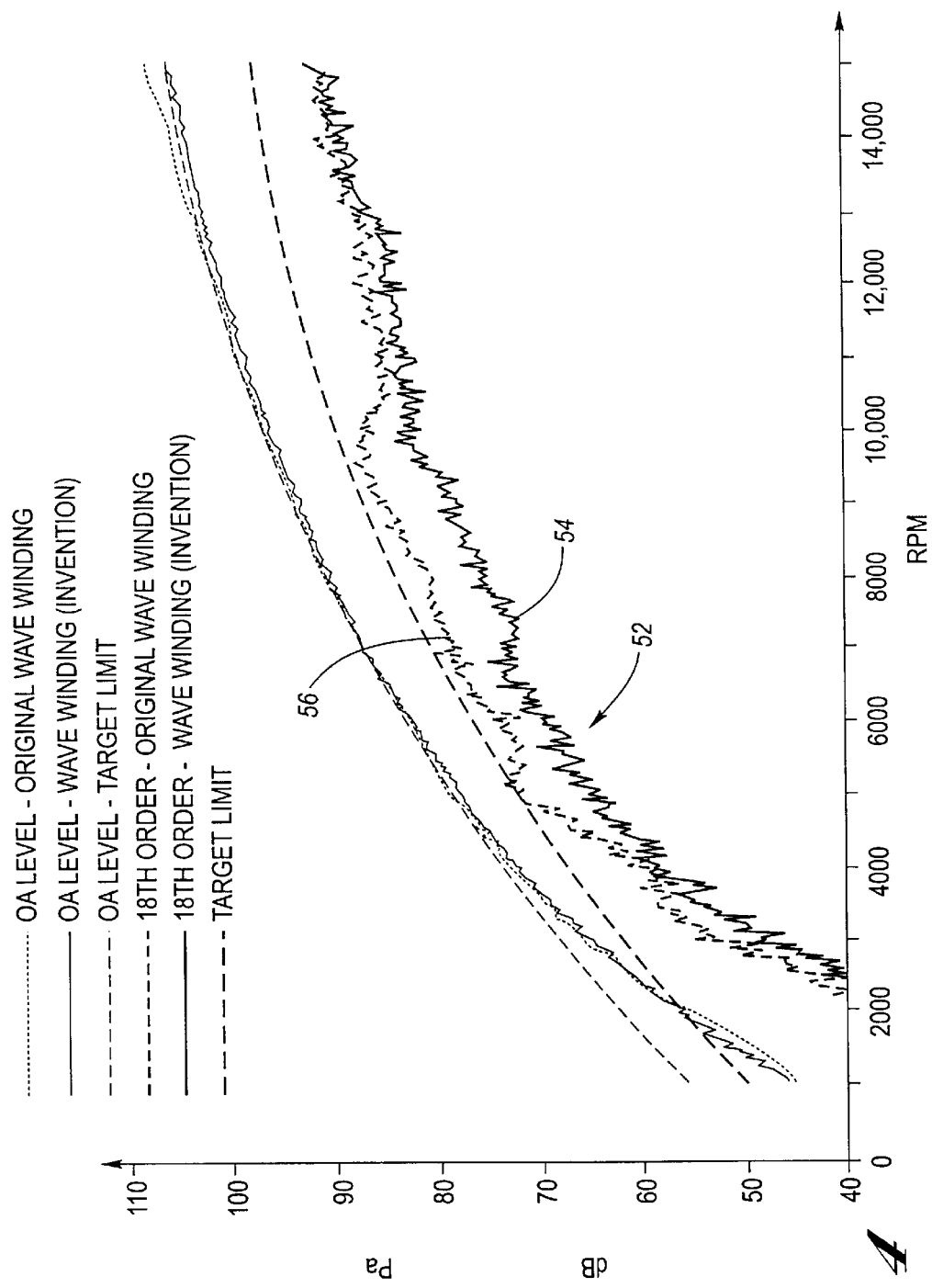
FIG. 4 is a simplified chart showing reduced airflow noise in accordance with the present invention.

FIG. 4 is a noise level versus generator speed (i.e., rpm) chart showing noise reduction according to the invention. The invention provides airflow noise reductions, both on an overall basis, as well as at particular order harmonics thereof (e.g., 6th, 12th, 18th, etc.). FIG. 4 shows an airflow noise reduction in detail for the 18th order harmonic. Note that in a region centered around 5000 rpm, designated region 52, the noise level for a generator having the inventive winding pattern, namely as shown in trace 54, is almost 10 dB reduced relative the conventional approaches as shown in trace 56.

The foregoing disclosure is intended merely to illustrate certain preferred embodiments of the invention. It is contemplated that those skilled in the art may find numerous ways to modify these embodiments without departing from the scope and spirit of the invention. As such, the scope of the invention is defined by the appended claims and not by the details of the specification.

What is claimed is:

1. A generator for a vehicle comprising;

a frame;

a rotor having n pole pairs mounted in said frame for rotation, wherein n is an integer equal to or greater than three;

a stator mounted to said frame, said stator including a core having a plurality of 12*n of radially inwardly projecting teeth with intervening slots;

a first stator winding having first, second and third phase coils;

a second stator winding having fourth, fifth and sixth phase coils;

rectifiers coupled between said first and second stator windings and an output;

wherein said first, second and third phase coils are sequentially wound on said core by being inserted in said slots such that respective starting leads of said first, second and third phase coils are progressively advanced by n/3 slots; and wherein said fourth, fifth and sixth phase coils are sequentially wound on said core by being inserted in said slots after said third phase coil such that respective starting leads of said fourth, fifth and sixth phase coils are progressively advanced by n/3 slots.

2. The generator of claim 1 wherein n=6.

3. The generator of claim 1 wherein said first and second stator windings are each three-phase windings.

4. The generator of claim 3 wherein said first, second and third phase coils are configured in a delta-connected arrangement, and said fourth, fifth and sixth phase coils are configured in a delta-connected arrangement.

5. The generator of claim 1 wherein starting leads of said phase coils of said first stator winding are advanced relative to said starting leads of said phase coils of said second stator winding by a predetermined offset defined by the following:

offset=65 deg. mech.+(60 deg. mech.)*($i$)

where $i$=an integer zero or greater.

6. The generator of claim 1 wherein said first, second and third phase coils are wound on said core in a direction that is the same as a movement of said rotor.

7. The generator of claim 1 wherein said fourth, fifth and sixth phase coils are wound on said core in said same direction.

8. The generator of claim 1 wherein at least one of said phase coils are wound in a straight wave configuration skipping n slots between alternations.

9. The generator of claim 8 wherein all of said phase coils are wound in said straight wave configuration skipping n slots between alternations.

10. A generator for an automotive vehicle comprising:
frame;
a rotor having n magnetic pole pairs mounted in said frame for rotation relative thereto, wherein n is an integer equal to or greater than three, said poles having a claw shaped configuration;
stator mounted to said frame, said stator including a core formed of magnetically permeable material having a plurality 12*n of radially inwardly projecting, axially extending teeth with intervening slots;
a first three-phase stator winding having first, second and third phase coils configured in a first delta-connected arrangement;
second three-phase stator winding having fourth, fifth and sixth phase coils configured in a second delta-connected arrangement;
three-phase rectifiers coupled between said first and second stator windings for rectifying output voltages developed by said first and second three-phase stator windings;
at least one fan configured to facilitate air flow through and around said first and second stator windings;
said first, second and third phase coils being sequentially wound on said core by being inserted in said slots in such order such that respective starting leads of said first, second and third phase coils are progressively advanced by n/3 slots, said fourth, fifth and sixth phase coils being sequentially wound on said core by being inserted in said slots after said third phase coil in such order such that respective starting leads of said fourth, fifth and sixth phase coils are progressively advanced by n/3 slots to thereby reduce a noise level arising due to said airflow through and around said first and second stator windings.

11. The generator of claim 10 wherein said phase coils are wound in a straight wave configuration skipping n slots between alternations.

12. The generator of claim 11 wherein n=6, and the number of stator slots equals 2.

13. The generator of claim 12 wherein said starting leads of said phase coils of said first stator winding are advanced relative to said starting leads of said phase coils of said second stator winding by a predetermined offset defined by the following:

$$\text{offset} = 65 \text{ deg. mech.} + (60 \text{ deg. mech.}) * (i)$$

where $i$=an integer zero or greater.

14. The generator of claim 13 wherein said first, second and third phase coils are wound on said core in a direction the same as a movement of said rotor.

15. The generator of claim 14 wherein said fourth, fifth and sixth phase coils are wound on said core in said same direction.

* * * * *